H. H. STERN.
TIRE.
APPLICATION FILED MAR. 26, 1919.

1,313,424.

Patented Aug. 19, 1919.

Witnesses
James F. Crown,
N. L. Collamer.

Inventor
Harry H. Stern,
By Richard B. Owen,
Attorney

UNITED STATES PATENT OFFICE.

HARRY H. STERN, OF MOSCOW, IDAHO.

TIRE.

1,313,424. Specification of Letters Patent. Patented Aug. 19, 1919.

Application filed March 26, 1919. Serial No. 285,211.

*To all whom it may concern:*

Be it known that I, HARRY H. STERN, a citizen of the United States, residing at Moscow, in the county of Latah and State of Idaho, have invented certain new and useful Improvements in Tires, of which the following is a specification.

This invention relates to resilient tires, and more especially of the cushion type as distinguished from pneumatic or inflated tires, and the object of the same is to make a tire of scrap tire casings.

In the construction of this tire, there is used a peculiar fastening means, and another object of this invention is to adapt this fastener to this use.

Other objects will appear in the following specification and claims, and attention is drawn to the drawings, wherein—

Figure 1:
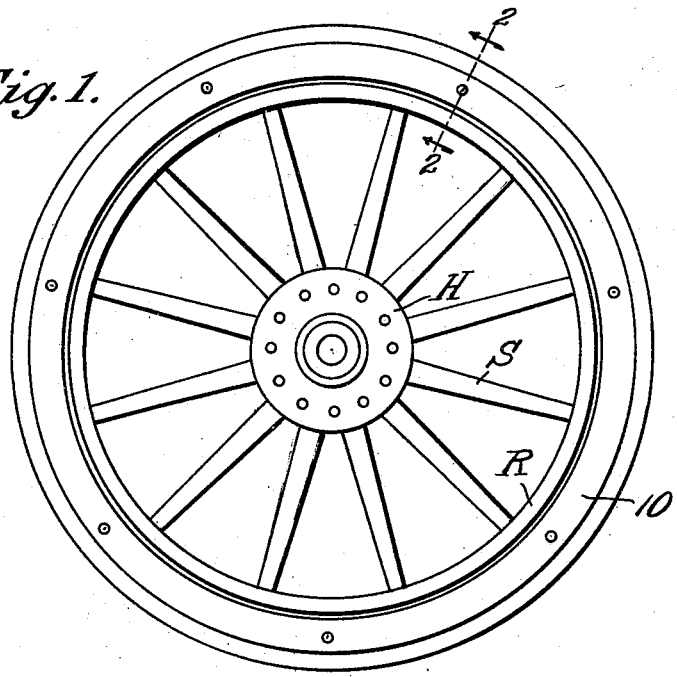
Figure 2:
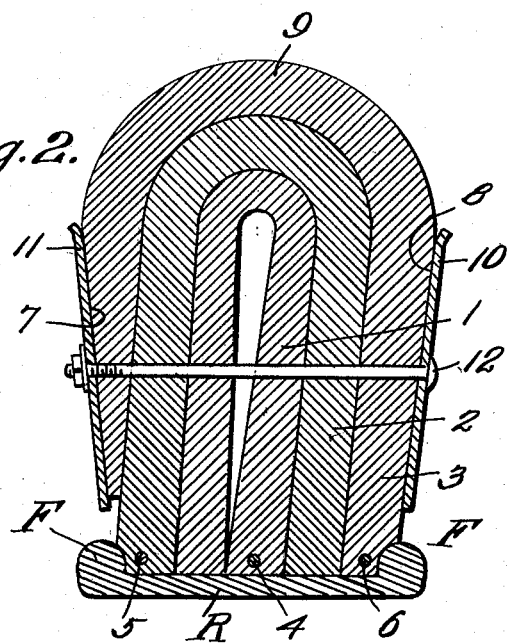

Figure 1 is a side elevation of a wheel, whereon is mounted a tire of this character, and Fig. 2 is an enlarged cross section through the rim of the wheel and the tire proper on the line 2—2 of Fig. 1.

In the drawings, the wheel is shown as composed of a hub H, spokes S and a rim R; the latter having side flanges as indicated at F in Fig. 2. However, my improved tire can be applied to any other form of rim, utilizing the devices thereon by means of which the ordinary pneumatic or cushion tire is applied, for holding this tire in place.

The gist of the present invention lies in making a cushion tire of scrap tire casings. As is well known, after casings or "shoes" have been repaired a reasonable number of times, they become useless, and in time they go to the junk heap or are "scrapped". The loss to motorists through this source, annually is enormous, and I propose to reduce this loss by providing a use for such scrap casings, especially on motor trucks and other vehicles where extreme elasticity is not absolutely necessary.

In making a tire of scrap material as suggested, I employ about three old casings or shoes. From each I remove the bead usually employed in connection with a curved flange on the edge of the rim R but leave the cords or wires which stiffen this edge elsewhere than through its bead. From the other edge, I remove both the bead and a considerable portion of the edge with all its cords or wires, so that this half of the casing becomes quite flexible. In Fig. 2 I have shown three old casings 1, 2 and 3 and their corded edges 4, 5 and 6.

The innermost casing I dispose with its corded edge 4 at about the transverse center of the rim R, and fold it rather closely upon itself as seen. The next casing 2 is disposed with its corded edge 5 against one flange F and has its center over the center of the innermost casing, with its edge resting on the rim as seen. The outermost casing 3 I dispose with its corded edge 6 against the other flange F, curving it over the bent portion of the second casing to form the tread of the tire, and preferably beveling off this other edge as indicated at 7, rather than carrying it down within the left hand flange D. It will be further obvious from Fig. 2 that by preference all casings are disposed on lines which diverge a little from the plane through the transverse center of the rim. In other words, the bent casings incline a little to one side, and it is said side which is opposite to the cut off edge 7. As a result, the outer side 8 of the outermost casing 3 is inclined to the right in Fig. 2, whereas the cut-off edge of the opposite side of the same casing inclines in the other direction. Or to put it differently, the sides of this composite tire diverge outward from the rim. The tread is indicated at 9.

While any means may be employed for fastening this tire upon the rim, I prefer to make use of two rings 10 and 11 and a number of bolts 12 connecting these rings and between them passing through both folds of the several casings. This holds the casings in the shape originally intended, and it will be observed that the several corded edges 4, 5 and 6 (which do not touch each other) are next the rim and fitted closely between the two flanges, whether the latter are fixed to the rim or detachable as is the case on some wheels. I would have the two rings 10 and 11 spaced outward somewhat from the flanges so that they rarely come in contact with the same. Also, I would have their outer edges spaced inward from the tread face 9, so that even under an extremely heavy load, the rings do not come in contact with the road-way. It is obvious that the material of the outer casing 3 will have to wear completely through beneath the tread, before the wear is thrown upon the material of the next casing, and so on; and therefore, this composite tread will stand usage for a long time, its life depending to a considerable extent upon the character of the casings from which it is made. It may be that only two casings will be necessary for light vehicles which will carry light loads, and on the other hand three or more might be employed to advantage on heavy vehicles as will be clearly understood.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. The herein described composite cushion tire for a motor vehicle, the same made up of a plurality of scrap tire casings whereof the innermost is folded upon itself with its edges adapted to rest upon the wheel rim, the next is folded around the innermost and its edges also are adapted to rest upon the wheel rim and the outermost is folded around the second with one edge adapted to rest on the wheel rim and the other to lie against the opposite face of the next casing inward, and means passing through both leaves of each casing for holding them together.

2. The herein described composite tire for a motor vehicle wheel, the same made up of a plurality of scrap tire casings whereof the innermost is folded upon itself with its edges adapted to rest upon the inner rim, the next is folded around the innermost and its edges also are adapted to rest upon the wheel rim and the outermost is folded around the second with one edge adapted to rest on the wheel rim and the other to lie against the opposite face of the next casing inward combined with a pair of rings lying against the outer faces of the outermost casing, the rings being out of contact with the rim, and bolts connecting the rings at intervals.

3. The herein described composite casing for motor vehicles, the same made up of a plurality of scrap tire casings whereof the innermost is folded upon itself with its casing adapted to rest upon the inner rim, the next is folded upon the innermost and its edges also are adapted to rest upon the wheel rim, and the outermost is folded around the second, combined with a pair of rings lying against the outer faces of the leaves of the outermost casing, the rings being out of contact with the rim and diverging from each other radially of the wheel and bolts connecting the rings at intervals.

In testimony whereof I affix my signature in presence of two witnesses.

HARRY H. STERN.

Witnesses:
JOHN NISBET,
CLAUDE E. CRAINE.

Copies of this patent may be obtained for five cents each, by addressing the "Commissioner of Patents, Washington, D. C."